(12) United States Patent
Murakami et al.

(10) Patent No.: US 9,855,619 B2
(45) Date of Patent: Jan. 2, 2018

(54) ARC WELDING SYSTEM, METHOD FOR PERFORMING ARC WELDING, AND METHOD FOR PRODUCING WELDED PRODUCT

(71) Applicant: KABUSHIKI KAISHA YASKAWA DENKI, Kitakyushu-shi (JP)

(72) Inventors: Masafumi Murakami, Kitakyushu (JP); Kiminori Nishimura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 265 days.

(21) Appl. No.: 14/731,371

(22) Filed: Jun. 4, 2015

(65) Prior Publication Data

US 2015/0352656 A1 Dec. 10, 2015

(30) Foreign Application Priority Data

Jun. 5, 2014 (JP) .................. 2014-116437

(51) Int. Cl.
*B23K 9/095* (2006.01)
*B23K 9/12* (2006.01)
*B23K 9/09* (2006.01)

(52) U.S. Cl.
CPC .......... *B23K 9/0953* (2013.01); *B23K 9/09* (2013.01); *B23K 9/095* (2013.01); *B23K 9/12* (2013.01); *B23K 9/125* (2013.01); *Y10S 901/02* (2013.01)

(58) Field of Classification Search
CPC ...... B23K 9/06–9/0678; B23K 9/073–9/0738; B23K 9/091; B23K 9/09;
(Continued)

(56) References Cited

U.S. PATENT DOCUMENTS 7,960,672 B2 * 6/2011 Nishimura ........... B23K 9/0671
219/125.1
9,050,677 B2 * 6/2015 Kawamoto ............ B23K 9/067
(Continued)

FOREIGN PATENT DOCUMENTS

JP 61-119380 6/1986
JP 62-084876 4/1987
(Continued)

OTHER PUBLICATIONS

Extended European Search Report for corresponding EP Application No. 15170777.5-1702 dated Dec. 17, 2015.
(Continued)

*Primary Examiner* — Thien S Tran
(74) *Attorney, Agent, or Firm* — Mori & Ward, LLP

(57) ABSTRACT

An arc welding system includes a feeder to feed a consumable electrode to a welding torch. A power source supplies power to between the electrode and an object. A welding controller controls the feeder and the power source to cause a short-circuit state and an arc state to repeat between the electrode and the object. A robot moves the welding torch along a welding line. A robot controller controls the robot. A detector detects whether a state between the electrode and the object is the short-circuit state or the arc state. A determiner determines whether a first period or a second period has elapsed since the detector detected the arc state. An instructor instructs the robot controller to decelerate the welding torch when the determiner determines that the first period has elapsed, and to stop the welding torch when the determiner determines that the second period has elapsed.

24 Claims, 6 Drawing Sheets

(58) Field of Classification Search
CPC ........ B23K 9/095; B23K 9/0953; B23K 9/12;
B23K 9/124–9/126; B23K 9/173
USPC ...... 219/124.03, 130.1, 130.01, 136–137 PS,
219/137.2, 137.21, 137.7–137.71
See application file for complete search history.

(56) References Cited

U.S. PATENT DOCUMENTS

| | | | |
|---|---|---|---|
| 2010/0059492 A1* | 3/2010 | Kawamoto | B23K 9/0953 219/130.1 |
| 2012/0074114 A1 | 3/2012 | Kawamoto et al. | |
| 2014/0319110 A1* | 10/2014 | Ingraham | B23K 9/095 219/130.01 |

FOREIGN PATENT DOCUMENTS

| | | |
|---|---|---|
| JP | 63-115680 | 5/1988 |
| JP | 2012-110911 | 6/2012 |
| JP | 2013-119087 | 6/2013 |
| WO | WO 2010/146844 | 12/2010 |

OTHER PUBLICATIONS

Japanese Office Action for corresponding JP Application No. 2014-116437 dated Jun. 27, 2017 (w/ English machine translation).

* cited by examiner

ARC WELDING SYSTEM, METHOD FOR PERFORMING ARC WELDING, AND METHOD FOR PRODUCING WELDED PRODUCT

CROSS-REFERENCE TO RELATED APPLICATIONS

The present application claims priority under 35 U.S.C. §119 to Japanese Patent Application No. 2014-116437, filed Jun. 5, 2014. The contents of this application are incorporated herein by reference in their entirety.

BACKGROUND

Field of the Invention

The embodiments disclosed herein relate to an arc welding system, a method for performing arc welding, and a method for producing a welded product.

Discussion of the Background

WO 2010/146844 discloses an arc welding system that performs welding by feeding a consumable electrode to a welding chip, causing an arc state and a short-circuit state to alternate between the distal end of the consumable electrode and a workpiece, and moving the welding chip along the welding line.

SUMMARY

According to one aspect of the present disclosure, an arc welding system includes a feeder, a power source, a welding controller, a robot, a robot controller, a detector, a determiner, and an instructor. The feeder is configured to feed a consumable electrode to a welding torch. The power source is configured to supply power to between the consumable electrode and a to-be-welded object. The welding controller is configured to control the feeder and the power source to cause a short-circuit state and an arc state to repeat between the consumable electrode and the to-be-welded object. The robot is configured to move the welding torch along a welding line. The robot controller is configured to control the robot. The detector is configured to detect whether a state between the consumable electrode and the to-be-welded object is the short-circuit state or the arc state. The determiner is configured to determine whether a first period or a second period longer than the first period has elapsed since the detector detected the arc state. The instructor is configured to instruct the robot controller to decelerate the welding torch when the determiner determines that the first period has elapsed, and is configured to instruct the robot controller to stop the welding torch when the determiner determines that the second period has elapsed.

According to another aspect of the present disclosure, a method for performing arc welding includes moving a welding torch held in a robot along a welding line while causing a short-circuit state and an arc state to repeat between a consumable electrode fed to the welding torch and a to-be-welded object. Whether a state between the consumable electrode and the to-be-welded object is the short-circuit state or the arc state is detected. Whether a first period or a second period longer than the first period has elapsed since the arc state was detected in the detecting step is determined. The robot is instructed to decelerate the welding torch when the first period is determined as having elapsed in the determining step, and the robot is instructed to stop the welding torch when the second period is determined as having elapsed in the determining step.

According to the other aspect of the present disclosure, a method for producing a welded product includes moving a welding torch held in a robot along a welding line while causing a short-circuit state and an arc state to repeat between a consumable electrode fed to the welding torch and a to-be-welded object. Whether a state between the consumable electrode and the to-be-welded object is the short-circuit state or the arc state is detected. Whether a first period or a second period longer than the first period has elapsed since the arc state was detected in the detecting step is determined. The robot is instructed to decelerate the welding torch when the first period is determined as having elapsed in the determining step, and the robot is instructed to stop the welding torch when the second period is determined as having elapsed in the determining step.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

An arc welding system, a method for performing arc welding, and a method for producing a welded product according to an embodiment will be described in detail below by referring to the accompanying drawings. The following embodiment is provided for exemplary purposes only and is not intended to limit the present disclosure.

Figure 1:
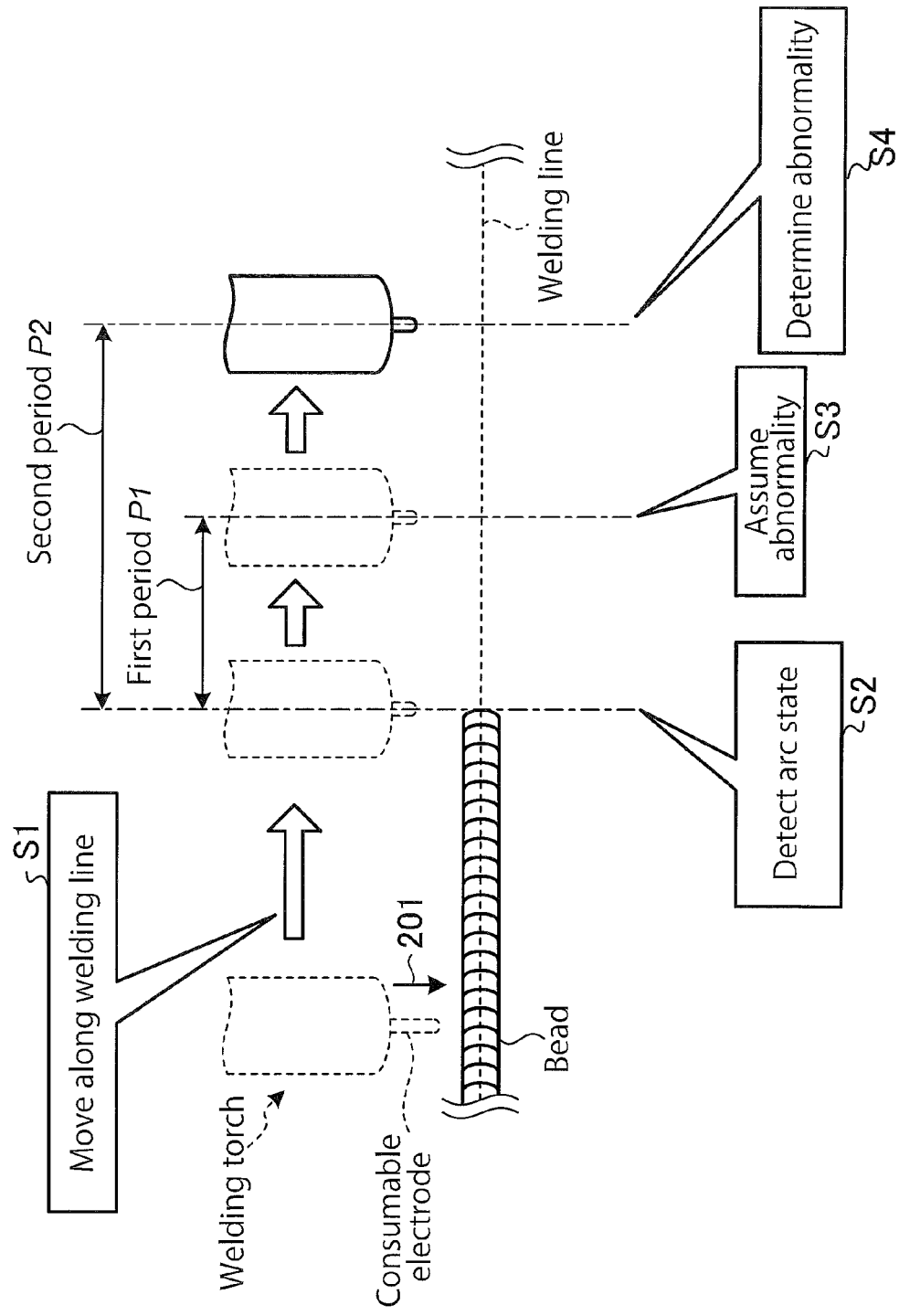
FIG. 1 schematically illustrates a method for performing arc welding according to an embodiment.

First, a method for performing arc welding according to this embodiment will be outlined by referring to FIG. 1. FIG. 1 schematically illustrates the method for performing arc welding according to this embodiment. For ease of description, the distances over which the welding torch moves are longer than actual distances in the predetermined periods "first period P1" and "second period P2" in FIG. 1.

As illustrated in FIG. 1, in the method for performing arc welding according to this embodiment, the welding torch to which the consumable electrode is fed is moved by, for example, a mover (not illustrated) made up of a robot and other elements. Specifically, the mover moves the welding torch while ensuring that the distal end of the consumable electrode, which is fed on the welding torch in the direction of the distal end of the welding torch (for example, in the arrow 201 direction), is along the welding line.

While the mover is moving the welding torch, power is supplied to between the consumable electrode and the to-be-welded object (not illustrated). The supply of power is controlled along with the feeding of the consumable electrode in such a manner that a "short-circuit state" and an "arc state" repeat between the consumable electrode and the to-be-welded object.

As used herein, the "short-circuit state" refers to a state in which the distal end of the consumable electrode is adjacent to or in contact with the to-be-welded object and a conduction is implemented between the consumable electrode and the to-be-welded object, in other words, a state in which a droplet is transferred from the consumable electrode to the to-be-welded object. The "arc state" refers to a state in which arc exists between the consumable electrode and the to-be-welded object, in other words, a state in which a droplet is formed and grown at the distal end of the consumable electrode.

Arc welding is performed by moving the welding torch using the mover while the "short-circuit state" and the "arc state" are repeating. A result is a bead formed on the to-be-welded object along the welding line.

In some cases, the consumable electrode may not be fed in an amount appropriate for arc welding because of clogging in a liner, failure of the feeding device, or other causes. In this case, the arc state continues for a longer time between the consumable electrode and the to-be-welded object, causing an abnormal welding state such as an abnormal bead.

In view of this, in the method for performing arc welding according to this embodiment detects whether the state between the consumable electrode and the to-be-welded object is the short-circuit state or the arc state based on at least one of welding current and welding voltage. Then, based on the period over which the detected arc state continues, the method adjusts the speed at which the welding torch moves so as to eliminate or minimize an abnormal welding state and resulting welding failure such as occurrence of intermittent unwelded portions on the bead.

The method for performing arc welding according to this embodiment will be described in more detail below. As illustrated in FIG. 1, in the method for performing arc welding according to this embodiment, arc welding is first performed by moving the welding torch along the welding line using the mover while the short-circuit state and the arc state are repeating between the consumable electrode and the to-be-welded object. As a result, a bead is formed on the to-be-welded object along the welding line (see step S1 in FIG. 1).

In this arc welding process, the method for performing arc welding according to this embodiment includes successively detecting whether the state between the consumable electrode and the to-be-welded object is the short-circuit state or the arc state.

Here, assume that the state between the consumable electrode and the to-be-welded object is detected as the arc state (see step S2 in FIG. 1). In this case, upon elapse of the first period P1, which is a predetermined period, since the arc state was detected, the method for performing arc welding according to this embodiment decelerates the welding torch under the assumption that the welding state is abnormal (see step S3 in FIG. 1).

That is, in the method for performing arc welding according to this embodiment, the continuation of the arc state to the elapse of the first period P1 is assumed as an abnormality such as feeding failure of the consumable electrode, and restricts the movement of the welding torch.

Then, in the method for performing arc welding according to this embodiment, when the state between the consumable electrode and the to-be-welded object is still the arc state after at the elapse of the second period P2, which is longer than the first period P1, after the arc state was detected, the assumed abnormality of the welding state is determined as an actual abnormality, and the welding torch is stopped (see step S4 in FIG. 1).

That is, in the method for performing arc welding according to this embodiment, the continuation of the arc state to the elapse of the second period P2 is determined as an actual abnormality such as feeding failure of the consumable electrode, and the welding torch is stopped.

Also in the method for performing arc welding according to this embodiment, when the short-circuit state is detected in the second period P2, the welding state is assumed as a normal state back from the abnormal state, and the deceleration state of the welding torch is released. A detailed procedure for the method for performing arc welding according to this embodiment will be described later by referring to FIGS. 4A and 4B.

Thus, the method for performing arc welding according to this embodiment detects whether the state between the consumable electrode and the to-be-welded object is the short-circuit state or the arc state based on at least one of welding current and welding voltage. Then, based on the period over which the detected arc state continues, the method adjusts the speed at which the welding torch moves so as to eliminate or minimize an abnormal welding state and a resulting welding failure such as occurrence of intermittent unwelded portions on the bead.

Thus, the method for performing arc welding according to this embodiment eliminates or minimizes what is called a "discontinuous bead", which is broken by intermittent unwelded portions, and eliminates or minimizes other occurrences that cause abnormal bead formation. As a result, the method for performing arc welding according to this embodiment improves welding quality.

While the welding torch is described as being decelerated upon or after the elapse of the first period P1, this should not be construed in a limiting sense. The movement of the welding torch after the elapse of the first period P1 and before the elapse of the second period P2 may be any convenient combination of deceleration and stopping.

Figure 2:
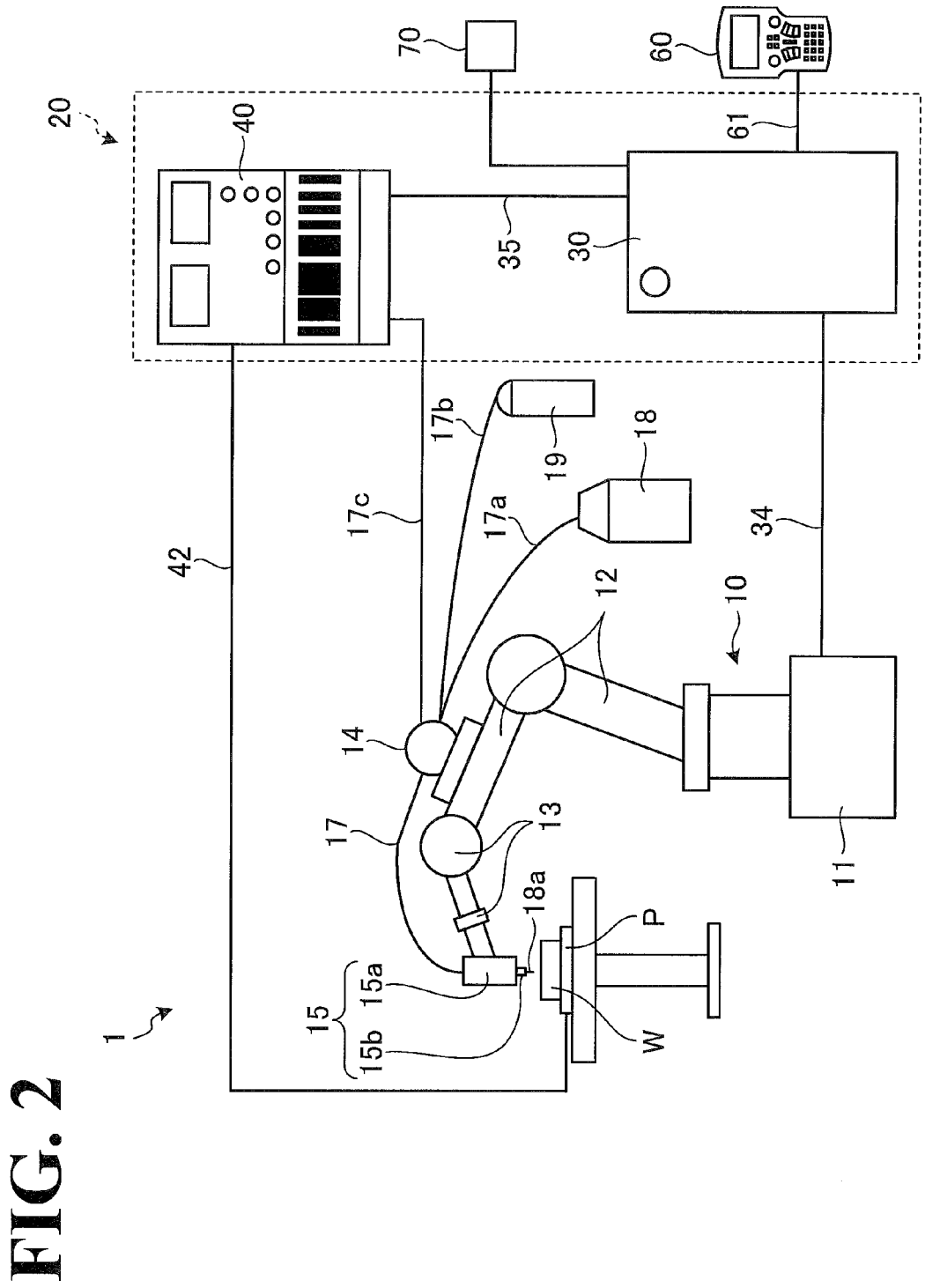
FIG. 2 illustrates a general arrangement of the arc welding system.

Next, a general arrangement of the arc welding system according to this embodiment will be described by referring to FIG. 2. FIG. 2 illustrates a general arrangement of the arc welding system.

As illustrated in FIG. 2, an arc welding system 1 according to this embodiment includes a robot 10 and an arc welder 20. The arc welder 20 brings the robot 10 into operation to weld a workpiece W on a positioner P. The positioner P includes an actuator, not illustrated, to adjust the position and posture of the workpiece W so as to enable the robot 10 to weld the workpiece W easily. The arc welder 20 and the positioner P are coupled to each other through a power supply line (hereinafter referred to as "cable") 42.

As illustrated in FIG. 2, the arc welder 20 includes a control apparatus 30 and a power source 40. The control apparatus 30 controls the robot 10 and the positioner P to perform arc welding on the workpiece W on the positioner P. To the control apparatus 30, an operation device 60 and an indicator 70 are coupled.

As illustrated in FIG. 2, the robot 10 is secured on the floor surface through a base 11. The robot 10 includes a plurality of robot arms 12. Each of the robot arms 12 is coupled to other robot arms 12 through joints 13.

Among the robot arms 12 coupled to each other through the joints 13, the robot arm 12 closest to the base 11 has a base end secured to the base 11, and the robot arm 12 farthest from the base 11 has a distal end attached with a welding device 15. Each of the joints 13 is driven by a servo motor and other elements not illustrated to change the position and posture of the welding device 15 into various positions and postures.

A feeder 14 is disposed at a predetermined position on a robot arm 12, and forwards a welding wire 18a stored in a welding wire container 18 to the welding device 15 through a torch cable 17. The torch cable 17 has a conduit cable 17a in the torch cable 17. The welding wire 18a, which is a consumable electrode, is forwarded to the welding device 15 through the conduit cable 17a.

The feeder 14 accepts shielding gas from a gas canister 19 and supplies the shielding gas to the welding device 15 through the torch cable 17. The torch cable 17 has a gas supply hose 17b in the torch cable 17. The shielding gas from the gas canister 19 is supplied to the welding device 15 through the gas supply hose 17b.

The feeder 14 is equipped with a feeding speed detector to detect feeding speed, which indicates the speed at which the welding wire 18a is fed to the welding device 15. Information on the feeding speed is output to the power source 40. The control apparatus 30 also controls, through the power source 40, the speed at which the feeder 14 supplies the welding wire 18a.

The welding device 15 includes a welding torch 15a and a contact chip 15b. The welding torch 15a has a hollow structure through which the torch cable 17 is passed. At a distal end of a welding torch 15a, the contact chip 15b is attached.

The contact chip 15b has a through hole through which the welding wire 18a passes to appear at the distal end of the contact chip 15b. A cable 17c is coupled to the contact chip 15b so as to enable the power source 40 to supply welding power for arc welding.

The welding torch 15a accepts the shielding gas supplied through the gas supply hose 17b. The supplied shielding gas is discharged through the distal end of the welding torch 15a so as to shield, from the atmosphere, arc generated from the distal end of the welding wire 18a.

The welding wire 18a may be fed in one direction toward the workpiece W (forward feeding, which is what is called push type of feeding). Another possible example is what is called push-pull type of feeding, which is to alternate the forward feeding and reverse feeding. In the reverse feeding, the welding wire 18a is fed in a direction opposite to the direction of the forward feeding. The push-pull type of feeding enables the welding wire 18a to more easily overcome clogging by itself in, for example, the torch cable 17 and the conduit cable 17a. This enables the welding wire 18a to be fed n a more proper manner.

The operation device 60 is used by an operator to program work details of the arc welding, to monitor the state of the arc welding, and to do other related work.

The operation device 60 transmits welding setting information to the control apparatus 30 through a communication network 61. Examples of the communication network 61 include, but are not limited to, general networks such as a wired LAN (Local Area Network) and a wireless LAN. Instead of the operation device 60 transmitting the welding setting information to the control apparatus 30, the control apparatus 30 may generate welding setting information based on information from the operation device 60.

The indicator 70 is coupled to the control apparatus 30 to indicate to the operator that the robot 10 has stopped operating because of a welding abnormality, which will be described later by referring to FIG. 4A. The indicator 70 includes a display, a speaker, and other elements to indicate warning information by making a visual indication, sound, voice, or other means of indication.

While in FIG. 2 the indicator 70 is separate from the control apparatus 30, this should not be construed in a limiting sense. Another possible example is that the indicator 70 is integral to the operation device 60 or any other various devices incorporated in the arc welding system 1.

Based on the welding setting information acquired from the operation device 60, the control apparatus 30 controls the robot 10 and the power source 40 through control cables 34 and 35 so as to effect arc welding on the workpiece W. The welding setting information includes robot control information and power source control information.

Specifically, based on the robot control information included in the welding setting information, the control apparatus 30 controls the robot 10 to change the position and posture of the welding device 15, which is attached to the distal end robot arm 12. The robot control information includes information on the welding line, information on the welding speed, information on the operation of the positioner P, and information on the feeding speed of the welding wire 18a.

The information on the welding line indicates, for example, an orbit that the welding device 15 makes. Specifically, the information on the welding line indicates changes in the position of the welding device 15 and in the posture of the welding device 15 relative to the workpiece W. The information on the welding line is input into the robot 10 as information on coordinates of the movement position or as posture information. The information on the welding speed indicates, for example, the speed of the arc welding (displacement of the welding device 15 per unit time) performed by the welding device 15. The information on the welding speed is output to the robot 10 as a welding speed command value.

The control apparatus 30 controls the power source 40 based on the power source control information included in the welding setting information. Specifically, the control apparatus 30 controls the feeder 14 to supply the welding wire 18a, controls the power source 40 to supply welding power to the welding device 15 based on the power source control information, and controls the welding device 15 to perform the arc welding. The power source control information includes a welding voltage command value, a welding current command value, a welding starting command, and a welding stopping command.

The power source 40 includes a current-voltage detector 41 (described later) to detect welding current and welding voltage between the welding wire 18a and the workpiece W. Based on information on the detection by the current-voltage detector 41, the control apparatus 30 controls the robot 10 during the arc welding. This will be described in detail later by referring to FIG. 3 and later drawings.

Thus, the control apparatus 30 keeps changing the position and posture of the welding device 15, feeds the welding wire 18a to the welding device 15 from the feeder 14, and supplies welding power from the power source 40 to the contact chip 15b.

Thus, the arc welding system 1 according to this embodiment generates arc at the distal end of the welding wire 18a to weld the workpiece W along the welding line while repeating the short-circuit state and the arc state.

Figure 3:
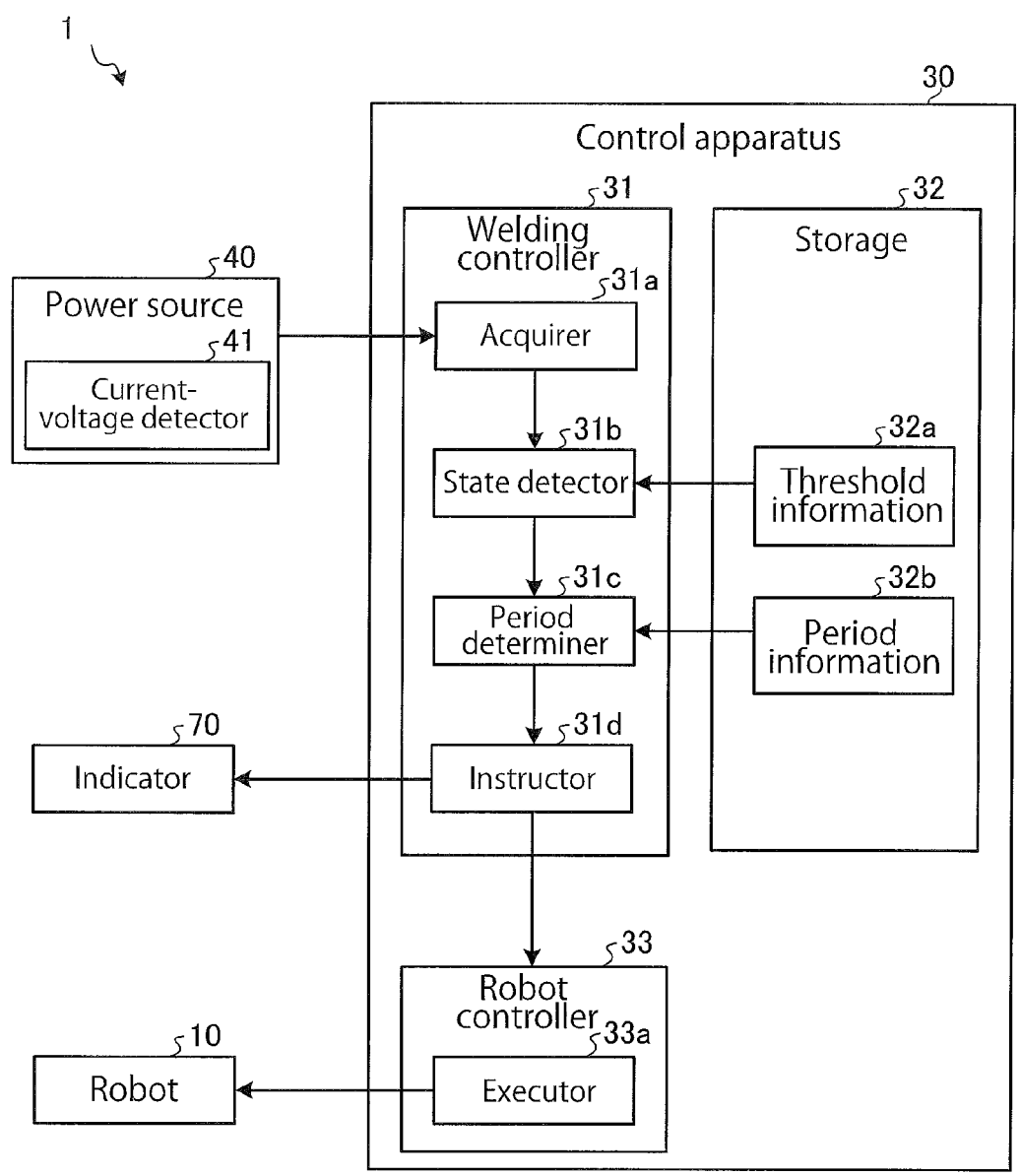
FIG. 3 is a block diagram of the arc welding system.

Next, an internal configuration of the arc welding system 1 according to this embodiment will be described by referring to FIG. 3. FIG. 3 is a block diagram of the arc welding system 1. It is noted that FIG. 3 only illustrates those components necessary for description of the arc welding system 1 according to this embodiment, omitting those components of general nature. The following description by referring to FIG. 3 will be mainly regarding an internal configuration of the control apparatus 30 and may omit those devices and apparatuses described above by referring to FIG. 2.

As illustrated in FIG. 3, the control apparatus 30 includes a welding controller 31, a storage 32, and a robot controller 33. The welding controller 31 includes an acquirer 31a, a state detector 31b, a period determiner 31c, and an instructor 31d. The acquirer 31a receives from the current-voltage detector 41 information indicating values of welding current and welding voltage between the welding wire 18a (see FIG. 2) and the workpiece W (see FIG. 2), and transmits the information to the state detector 31b.

The state detector 31b compares the values of welding current and welding voltage with threshold information 32a to detect whether the state between the consumable electrode and the workpiece W is the short-circuit state or the arc state. The threshold information 32a includes a threshold for the welding current value (hereinafter referred to as "threshold current Ith") and a threshold for the welding voltage value (hereinafter referred to as "threshold voltage Vth"). The threshold information 32a is registered in the storage 32 in advance.

For example, the state detector 31b detects the short-circuit state when the welding current value is higher than the threshold current Ith or when the welding voltage value is equal to or less than the threshold voltage Vth. In contrast, the state detector 31b detects the arc state when the welding current value is equal to or less than the threshold current Ith or when the welding voltage value is higher than the threshold voltage Vth. Then, the state detector 31b transmits a result of the detection to the period determiner 31c.

The state detector 31b may alternatively compare, with the threshold information 32a, an average value of the welding current (hereinafter referred to as "average current value") over a predetermined fixed period and an integrated value of the welding voltage (hereinafter referred to as "integrated voltage value") over a predetermined fixed period. Then, the state detector 31b may detect whether the state between the consumable electrode and the workpiece W is a "state including the short-circuit state" or the arc state. As used herein, the "state including the short-circuit state" refers to a state in which the short-circuit state and the arc state repeat during the arc welding.

Specifically, the state detector 31b detects the state including the short-circuit state when the average current value is higher than the threshold current Ith or when the integrated voltage value is equal to or less than the threshold voltage Vth. In contrast, the state detector 31b detects the arc state when the average current value is equal to or less than the threshold current Ith or when the integrated voltage value is higher than the threshold voltage Vth.

In response to a result of the detection received from the state detector 31b, the period determiner 31c makes a determination as to the period of the arc state based on period information 32b. Then, the period determiner 31c generates a robot movement permission signal and a welding abnormality detection signal and transmits the signals to the instructor 31d.

Specifically, when the state detector 31b has detected the short-circuit state or the state including the short-circuit state, the period determiner 31c generates the robot movement permission signal and transmits the robot movement permission signal to the instructor 31d. When the state detector 31b has detected the arc state, the period determiner 31c determines the period of the arc state based on the period information 32b. Then, the period determiner 31c stops generation of the robot movement permission signal or generates the welding abnormality detection signal. This will be described in detail later by referring to FIGS. 4A and 4B.

The period information 32b includes the time from the state detector 31b's detection of the arc state to the stopping of generation of the robot movement permission signal, and the time from the state detector 31b's detection of the arc state to the generation of the welding abnormality detection signal. The period information 32b is registered in the storage 32 in advance.

Based on the information from the period determiner 31c, the instructor 31d generates an operation signal to operate the various devices, such as the power source 40 and the indicator 70, and outputs the operation signal to the various devices. The instructor 31d also instructs the robot controller 33 to operate the robot 10.

The robot controller 33 includes an executor 33a to make the robot 10 perform a predetermined operation. Specifically, based on the instruction from the instructor 31d, the robot controller 33 decelerates or stops the robot 10 (see FIG. 2), for example.

The storage 32 is a storage device such as a hard disc drive and a nonvolatile memory, and stores the threshold information 32a and the period information 32b. The details of the threshold information 32a and the period information 32b are as described above.

It is noted that the internal elements of the control apparatus 30 illustrated in FIG. 3 may not necessarily be disposed in the control apparatus 30 alone. Another possible example is that the control section including the welding controller 31 and the control section including the robot controller 33 are separate from each other. Still another possible example is that the internal elements of the control apparatus 30 are provided in a plurality of housings respectively corresponding to the various control-target devices.

Next, by referring to FIG. 4A, description will be made with regard to the case where the arc welding system 1 according to this embodiment determines the welding state as abnormal based on the average current value and stops the robot 10. FIG. 4A is a first exemplary operation time chart of arc welding.

In the time chart, the vertical axes denote the average current value, the robot movement permission signal, the welding abnormality detection signal, the robot operation. The horizontal axes denote time. It is noted that the time course and changes in the average current value are simplified in FIG. 4A and thus may not necessarily correspond to actual measured values.

In the following description, the welding current and welding voltage supplied to between the welding wire 18a and the workpiece W each have a rectangular waveform, for ease of description. This, however, should not be construed as limiting the waveform shape, other examples including, but not limited to, a trapezoidal waveform, a triangular waveform, and a sine waveform.

First, it will be assumed that at time T0, the average current value is higher than the threshold current Ith, and at time T1, the average current value changes from a value higher than the threshold current Ith to a value equal to or less than the threshold current Ith. When the average current value is higher than the threshold current Ith, the control apparatus 30 determines the present state as the state including the short-circuit state, while when the average current value is equal to or less than the threshold current Ith, the control apparatus 30 determines the present state as the arc state. In the state including the short-circuit state, the short-circuit state and the arc state repeat during the arc welding.

When the average current value is equal to or less than the threshold current Ith over the period between time T1 and time T2, the control apparatus 30 assumes that the arc involved in the arc welding is stable (the robot movement permission signal is "ON"). Under this assumption, the control apparatus 30 keeps moving the robot 10 (the robot operation is "ON"). In FIG. 4A, the period between time T0 and time T2 is indicated as "movement period" of the robot 10, and the period between time T1 and time T2 is indicated as "first period P1".

When the first period P1 has elapsed since the average current value became equal to or less than the threshold current Ith, the control apparatus 30 stops the generation of the robot movement permission signal (the robot movement permission signal is "OFF"), and decelerates the operation of the robot 10, that is, decelerates the movement of the welding device 15 (the robot operation is "OFF"). Thus, based on the elapse of the first period P1, the control apparatus 30 assumes that the welding state is abnormal because of clogging of the welding wire 18a or other causes. Under this assumption, the control apparatus 30 decelerates the movement of the welding device 15 to eliminate or minimize welding failure. The deceleration starts from the time when the average current value becomes equal to or less than the threshold current Ith and continues until time T3, at which the second period P2 elapses.

It is noted that the operation of the robot 10 during the period between time T2 and time T3 will not be limited to deceleration of the welding device 15. The operation of the robot 10 may be a combination of deceleration and stopping of the welding device 15. In FIG. 4A, the period between time T2 and time T3 is denoted as "deceleration period" for the robot 10, and the period between time T1 and time T3 is denoted as "second period P2".

While the robot operation is "OFF" during the period between time T2 and time T3 for the sake of description, the "OFF" period includes a period for which the robot 10 moves at a speed smaller than the speed during the movement period.

When the second period P2 has elapsed since the average current value became equal to or less than the threshold current Ith (that is, at time T3), the control apparatus 30 determines the assumed abnormality of the welding state as an actual abnormality. Based on this determination, the control apparatus 30 generates a welding abnormality detection signal (the welding abnormality detection signal is "ON") to stop the operation of the robot 10. In FIG. 4A, the period later than time T3 is denoted as "stopping period" for the robot 10.

Thus, the arc welding system 1 according to this embodiment stops the movement of the robot 10 when a welding abnormality is detected. This eliminates or minimizes welding failure such as discontinuity of the bead and other possible bead abnormalities caused when the arc state continues for a longer time than desired because of clogging of the welding wire 18a or other causes. Thus, the arc welding system 1 according to this embodiment improves welding quality.

The control apparatus 30 may use the indicator 70 (see FIG. 2) to indicate the stopping of the operation of the robot 10 at time T3 to the operator or another worker. This enables the operator to be more readily aware of the abnormal state of the arc welding.

As described above, when an abnormality of the welding state assumed at the elapse of the first period P1 is so temporary that the welding state returns to the normal state within a predetermined period, the robot 10 may resume moving.

This will be described by referring to FIG. 4B. FIG. 4B is a second exemplary operation time chart of arc welding. For ease of description, FIG. 4B illustrates times T0 to T3 for the same purpose as in FIG. 4A.

As illustrated in FIG. 4B, in the arc welding system 1 according to this embodiment, when the first period P1 has elapsed since the average current value became equal to or less than the threshold current Ith, and when the average current value becomes higher than the threshold current Ith value before the elapse of the second period P2 (that is, at time T4), the control apparatus 30 assumes that the welding state has returned to the normal state. Under this assumption, the control apparatus 30 switches the robot movement permission signal from OFF to ON.

Also, the control apparatus 30 switches the robot operation from OFF to ON to release the deceleration state of the robot 10. Thus, the robot 10 resumes moving at its usual movement speed to continue arc welding using the welding device 15. In this case, the control apparatus 30 keeps the welding abnormality detection signal OFF.

Thus, the arc welding system 1 according to this embodiment decelerates the robot 10 when the first period P1 has elapsed since the average current value became equal to or less than the threshold current Ith. When the welding state returns to the normal state before the elapse of the second period P2, the arc welding system 1 releases the deceleration state.

This ensures that in the arc welding system 1 according to this embodiment, even if the welding state is temporarily abnormal, the welding work continues without occurrence of intermittent unwelded portions on the bead. Thus, the arc welding system 1 according to this embodiment eliminates or minimizes degradation of production efficiency caused by, for example, necessity of involvement of manual work. This results in improved welding quality.

Figure 4A:
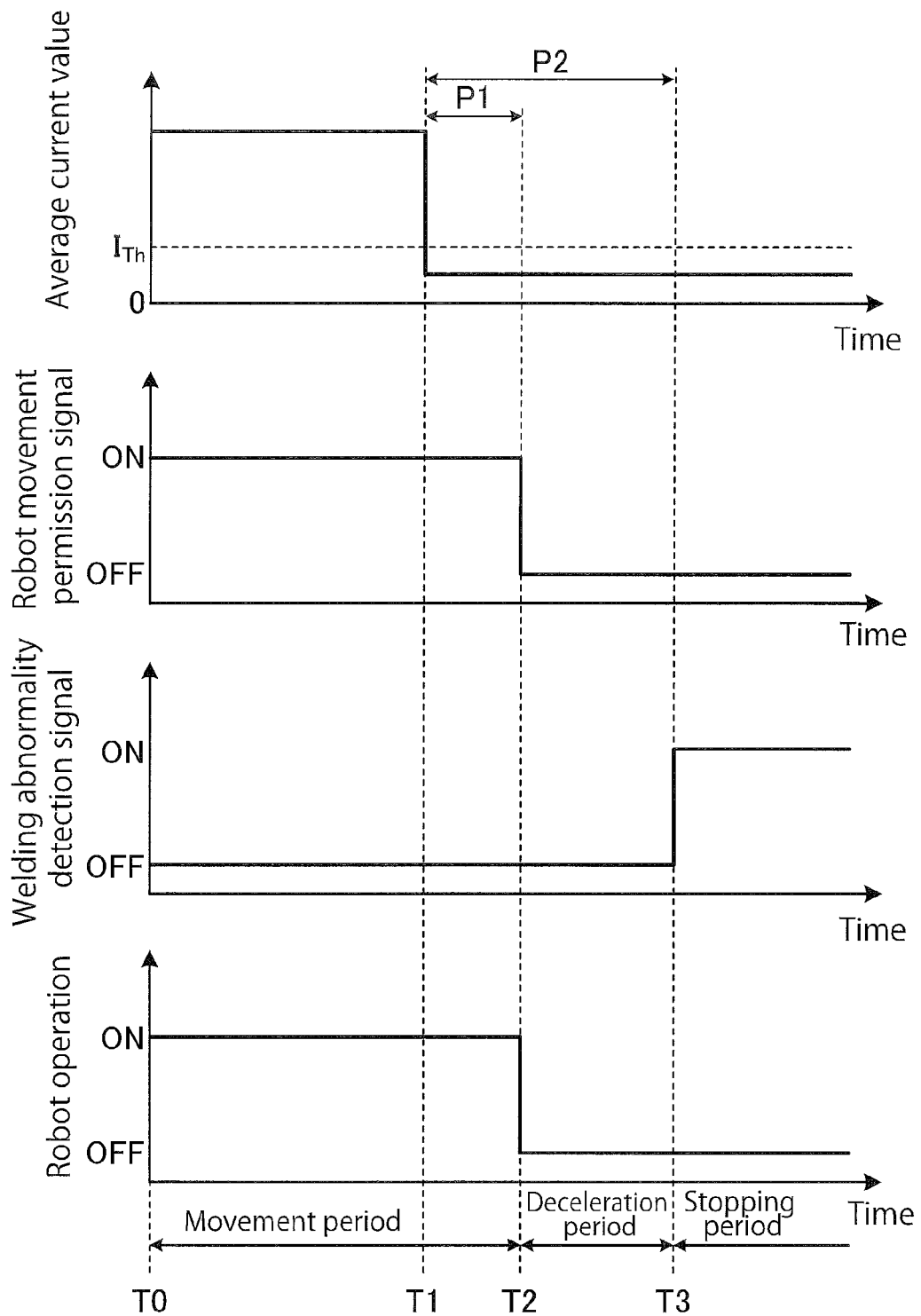
FIG. 4A is a first exemplary operation time chart of arc welding.
Figure 4B:
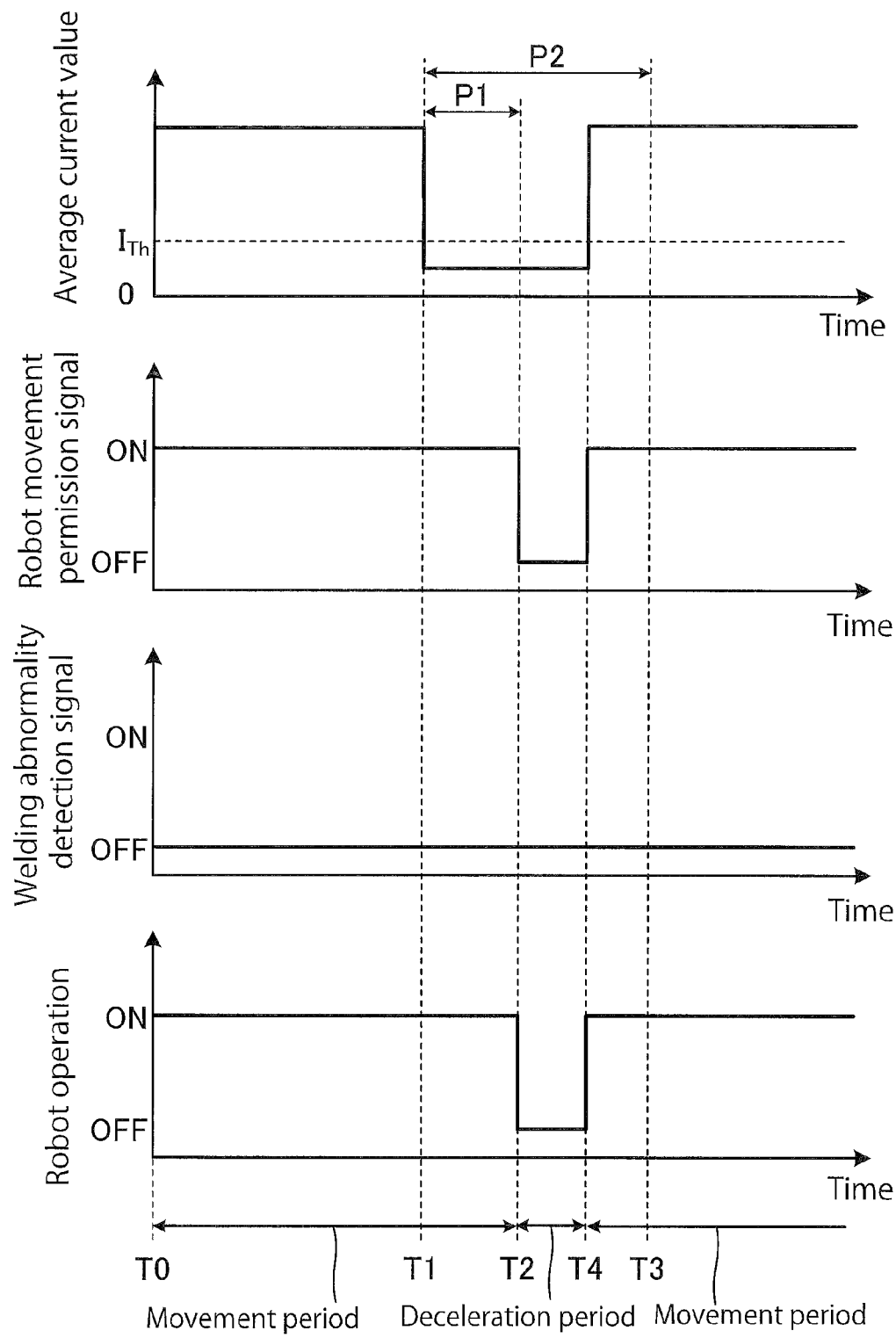
FIG. 4B is a second exemplary operation time chart of arc welding.

While in FIGS. 4A and 4B the generation of arc is detected based on the average current value, this should not be construed in a limiting sense. Another possible example is to detect the generation of arc based on an integrated voltage value over a predetermined fixed period.

In this case, when the integrated voltage value over the predetermined fixed period is greater than the threshold voltage Vth, the control apparatus 30 detects the arc state on the welding device 15, while when the integrated voltage value is equal to or less than the threshold voltage Vth, the control apparatus 30 detects the state including the short-circuit state on the welding device 15.

In the above description, the generation of the arc-related signals are determined based on an average value of welding current over a predetermined fixed period or based on an integrated value of welding voltage over a predetermined fixed period. It is also possible to generate the arc-related signals based on an instantaneous value (what is called "real-time data") of welding current or welding voltage.

This improves responsiveness of the generation and stopping of the robot movement permission signal to changes in actual welding current or actual welding voltage. Thus, even if the average current value or the integrated voltage value frequently changes in a short period of time, the operation and stopping of the robot 10 is responsive to the frequent changes in the average current value or the integrated voltage value, and the resulting bead is without intermittent portions.

The period in which the average current value or the integrated voltage value is calculated, the first period P1 and the second period P2, and the movement speed of the robot 10 may be optimal values set in advance based on an experiment, a test, or a similar method.

The first period P1 or the second period P2 may be determined conveniently based on the movement speeds of the robot 10, that is, the welding torch 15a in the movement periods illustrated in FIGS. 4A and 4B. For example, it is possible to make the first period P1 or the second period P2 shorter as the movement speed of the welding torch 15a is higher.

This ensures that irrespective of the movement speeds of the welding torch 15a in the movement periods, the movement distance of the welding torch 15a after the elapse of the first period P1 or the second period P2 is kept within a predetermined range. This, in turn, eliminates or minimizes occurrence of intermittent unwelded portions on the bead.

Figure 5:
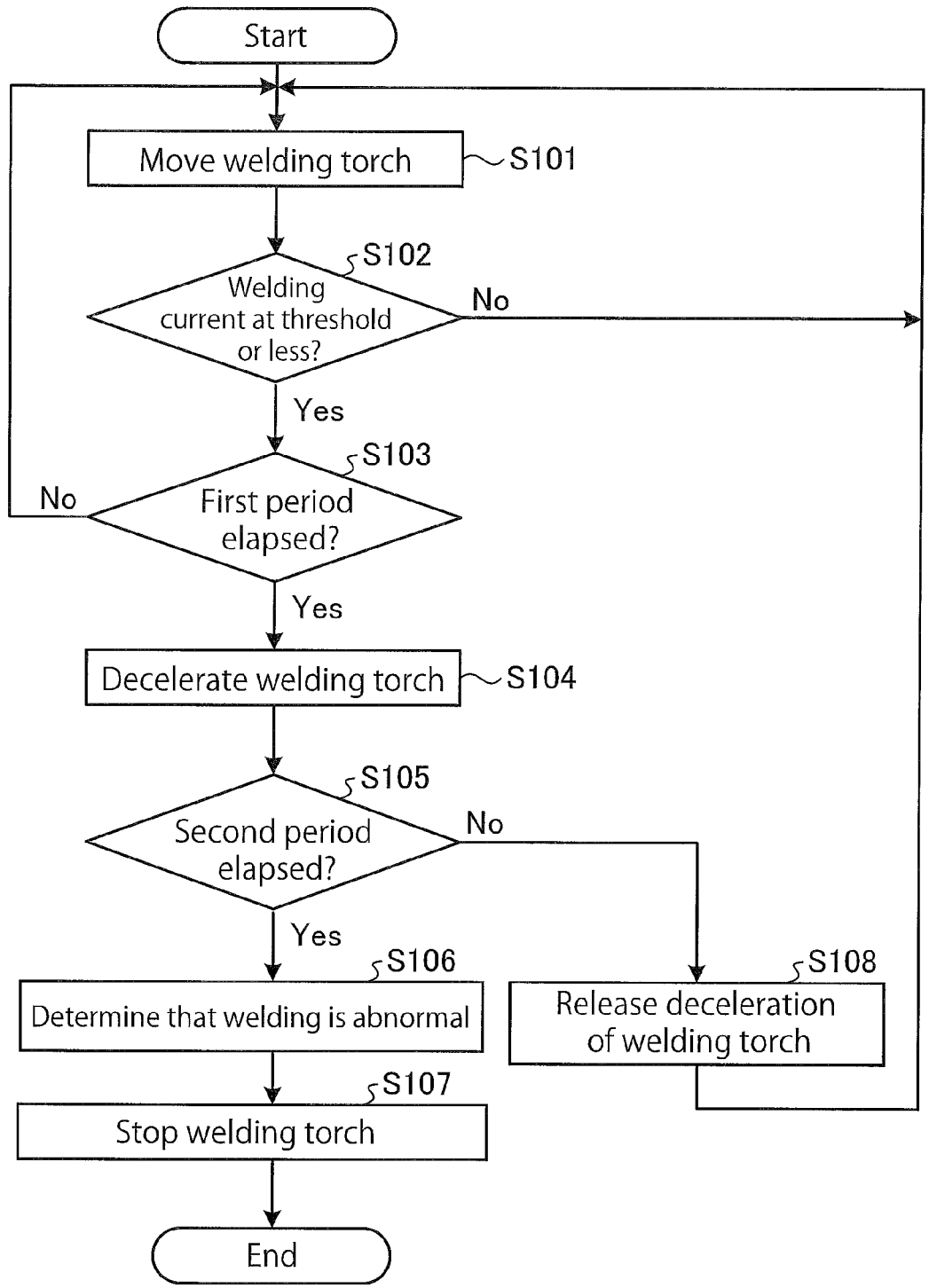
FIG. 5 is a flowchart of a procedure for processing performed by the arc welding system.

Next, a procedure for processing performed by the arc welding system 1 according to this embodiment will be described by referring to FIG. 5. FIG. 5 is a flowchart of a procedure for the processing performed by the arc welding system 1 according to this embodiment. The following description by referring to FIG. 5 will take as an example a case where the control apparatus 30 determines the generation state of arc on the welding device 15 based on the average current value.

As illustrated in FIG. 5, the robot 10 moves the welding torch 15a along the welding line to weld the workpiece W (step S101). Then, when welding current, an example of which is an average current value, is equal to or less than the threshold current Ith (step S102, Yes), the control apparatus 30 determines whether the state in which the average current value is equal to or less than the threshold current Ith has continued to the elapse of the first period P1 (step S103).

When the state in which the average current value is equal to or less than the threshold current Ith has continued to the elapse of the first period P1 (step S103, Yes), the control apparatus 30 decelerates the operation of the robot 10 (that is, decelerates the movement of the welding torch 15a) (step S104). The control apparatus 30 may decelerate the operation of the robot 10 (the welding torch 15a) until the robot 10 stops.

When the determination condition for step S102 is not met (that is, when the average current value is higher than the threshold current Ith) (step S102, No), the processing later than step S101 is repeated.

When the determination condition for step S103 is not met (that is, when the state in which the average current value is equal to or less than the threshold current Ith has not continued to the elapse of the first period P1) (step S103, No), the processing later than step S101 is repeated.

Next, the control apparatus 30 determines whether the state in which the average current value is equal to or less than the threshold current Ith has continued to the elapse of the second period P2, which is longer than the first period P1 (step S105). When the state in which the average current value is equal to or less than the threshold current Ith has continued to the elapse of the second period P2 (step S105, Yes), the control apparatus 30 determines that the welding is abnormal (step S106). Then, the control apparatus 30 stops the operation of the robot 10 (that is, stops the movement of the welding torch 15a) (step S107), and the processing is ended.

When the determination condition for step S105 is not met (that is, when the state in which the average current value is equal to or less than the threshold current Ith has not continued to the elapse of the second period P2) (step S105, No), the control apparatus 30 releases the deceleration of the welding torch 15a (the robot 10) (step S108), and the processing later than step S101 is repeated.

As has been described hereinbefore, the arc welding system according to this embodiment includes feeder, a power source, a welding controller, a robot, a robot controller, a detector (state detector), a determiner (period determiner), and an instructor. The feeder feeds the consumable electrode to the welding torch.

The power source supplies power to between the consumable electrode (welding wire) and the to-be-welded object. The welding controller controls the feeder and the power source to cause the short-circuit state and the arc state to repeat between the consumable electrode and the to-be-welded object (workpiece).

The robot moves the welding torch along the welding line. The robot controller controls the robot. The detector detects whether the state between the consumable electrode and the to-be-welded object is the short-circuit state or the arc state. The determiner determines whether the first period or the second period, which is longer than first period, has elapsed since the detector detected the arc state.

The instructor instructs the robot controller to decelerate the welding torch when the determiner determines that the first period has elapsed. When the determiner determines that the second period has elapsed, the instructor instructs the robot controller to stop the welding torch.

Thus, the arc welding system according to this embodiment decelerates or stops the welding torch in accordance with the welding state. This enables the arc welding system according to this embodiment to eliminate or minimize occurrence of intermittent unwelded portions on the welding bead, resulting in improved welding quality.

While in this embodiment the workpiece is disposed on the positioner, the workpiece may be placed on any other table than the positioner if it is not necessary to change the position and posture of the workpiece. In this case, the cable from the power source may be coupled to the workpiece or the table.

While in this embodiment the power source includes the current-voltage detector, this should not be construed in a limiting sense. The control apparatus may include one or both of the current detector and the voltage detector. While in this embodiment the power source and the control apparatus are separate from each other, the power source and the control apparatus may be integral to each other.

While in this embodiment one workpiece is welded using one robot provided with a welding device, this should not be construed in a limiting sense. One workpiece may be welded using a plurality of robots each provided with a welding device. In this case, some or all of the plurality of robots may share the control apparatus or the power source.

In this embodiment, the period in which the average current value or the integrated voltage value is calculated, the first period P1 and the second period P2, the movement speed of the robot 10, and other various settings may be made and adjustable by handling the operation device. This enables the operator on site to easily adjust the various settings based on, for example, a resulting product welded using an actual welding device. It is also possible to make and make adjustable the various settings by operating the control apparatus or the power source, instead of by handling the operation device.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An arc welding system comprising:
   a feeder configured to feed a consumable electrode to a welding torch;
   a power source configured to supply power to between the consumable electrode and a to-be-welded object;
   a welding controller configured to control the feeder and the power source to cause a short-circuit state and an arc state to repeat between the consumable electrode and the to-be-welded object;
   a robot configured to move the welding torch along a welding line;
   a robot controller configured to control the robot; and
   a welding controller configured to:
      detect whether a state between the consumable electrode and the to-be-welded object is the short-circuit state or the arc state,
      determine whether a first period or a second period longer than the first period has elapsed since the welding controller detected the arc state, and
      instruct the robot controller to decelerate a movement of the welding torch relative to the to-be-welded object in response to a determination by the welding controller that the first period has elapsed, and configured to instruct the robot controller to stop the movement of the welding torch relative to the to-be-welded object in response to a determination by the welding controller that the second period has elapsed.

2. The arc welding system according to claim 1, wherein when the welding controller determines that the first period has elapsed, and when the welding controller detects the short-circuit state before determining that the second period has elapsed, the welding controller is configured to instruct the robot controller release deceleration of the welding torch.

3. The arc welding system according to claim 1, further comprising an indicator,
   wherein when the welding controller determines that the second period has elapsed, the welding controller is configured to instruct the indicator to indicate that the welding torch is stopped.

4. The arc welding system according to claim 1,
   wherein the welding controller is configured to instruct the feeder to alternate forward feeding and reverse feeding so as to feed the consumable electrode to the welding torch,
   wherein in the forward feeding, the feeder is configured to feed the consumable electrode in a first direction toward the to-be-welded object, and
   wherein in the reverse feeding, the feeder is configured to feed the consumable electrode in a second direction opposite to the first direction.

5. The arc welding system according to claim 1, wherein the welding controller is configured to determine whether at least one period among the first period and the second period has elapsed while changing the at least one period among the first period and the second period, the change of the at least one period being performed in accordance with a speed at which the robot moves the welding torch.

6. A method for performing arc welding, the method comprising:
   moving a welding torch held in a robot along a welding line while causing a short-circuit state and an arc state to repeat between a consumable electrode fed to the welding torch and a to-be-welded object;
   detecting whether a state between the consumable electrode and the to-be-welded object is the short-circuit state or the arc state;
   determining whether a first period or a second period longer than the first period has elapsed since the arc state was detected in the detecting step; and
   instructing the robot to decelerate a movement of the welding torch relative to the to-be-welded object in response to a determination in the determining step that the first period has elapsed, and instructing the robot to stop the movement of the welding torch in response to a determination in the determining step that the second period has elapsed.

7. A method for producing a welded product, the method comprising:
   moving a welding torch held in a robot along a welding line while causing a short-circuit state and an arc state to repeat between a consumable electrode fed to the welding torch and a to-be-welded object;
   detecting whether a state between the consumable electrode and the to-be-welded object is the short-circuit state or the arc state;
   determining whether a first period or a second period longer than the first period has elapsed since the arc state was detected in the detecting step; and
   instructing the robot to decelerate a movement of the welding torch relative to the to-be-welded object in response to a determination in the determining step that the first period has elapsed, and instructing the robot to stop the movement of the welding torch in response to a determination in the determining step that the second period has elapsed.

8. The arc welding system according to claim 2, further comprising an indicator,
   wherein when the welding controller determines that the second period has elapsed, the welding controller is configured to instruct the indicator to indicate that the welding torch is stopped.

9. The arc welding system according to claim 2,
   wherein the welding controller is configured to instruct the feeder to alternate forward feeding and reverse feeding so as to feed the consumable electrode to the welding torch,
   wherein in the forward feeding, the feeder is configured to feed the consumable electrode in a first direction toward the to-be-welded object, and
   wherein in the reverse feeding, the feeder is configured to feed the consumable electrode in a second direction opposite to the first direction.

10. The arc welding system according to claim 3,
    wherein the welding controller is configured to instruct the feeder to alternate forward feeding and reverse feeding so as to feed the consumable electrode to the welding torch,
    wherein in the forward feeding, the feeder is configured to feed the consumable electrode in a first direction toward the to-be-welded object, and
    wherein in the reverse feeding, the feeder is configured to feed the consumable electrode in a second direction opposite to the first direction.

11. The arc welding system according to claim 8,
    wherein the welding controller is configured to instruct the feeder to alternate forward feeding and reverse feeding so as to feed the consumable electrode to the welding torch, wherein in the forward feeding, the feeder is configured to feed the consumable electrode in a first direction toward the to-be-welded object, and wherein in the reverse feeding, the feeder is configured to feed the consumable electrode in a second direction opposite to the first direction.

12. The arc welding system according to claim 2, wherein the welding controller is configured to determine whether at least one period among the first period and the second period has elapsed while changing the at least one period among the first period and the second period, the change of the at least one period being performed in accordance with a speed at which the robot moves the welding torch.

13. The arc welding system according to claim 3, wherein the welding controller is configured to determine whether at least one period among the first period and the second period has elapsed while changing the at least one period among the first period and the second period, the change of the at least one period being performed in accordance with a speed at which the robot moves the welding torch.

14. The arc welding system according to claim 4, wherein the welding controller is configured to determine whether at least one period among the first period and the second period has elapsed while changing the at least one period among the first period and the second period, the change of the at least one period being performed in accordance with a speed at which the robot moves the welding torch.

15. The arc welding system according to claim 8, wherein the welding controller is configured to determine whether at least one period among the first period and the second period has elapsed while changing the at least one period among the first period and the second period in accordance with a speed at which the robot moves the welding torch.

16. The arc welding system according to claim 9, wherein the welding controller is configured to determine whether at least one period among the first period and the second period has elapsed while changing the at least one period among the first period and the second period, the change of the at least one period being performed in accordance with a speed at which the robot moves the welding torch.

17. The arc welding system according to claim 10, wherein the welding controller is configured to determine whether at least one period among the first period and the second period has elapsed while changing the at least one period among the first period and the second period, the change of the at least one period being performed in accordance with a speed at which the robot moves the welding torch.

18. The arc welding system according to claim 11, wherein the welding controller is configured to determine whether at least one period among the first period and the second period has elapsed while changing the at least one period among the first period and the second period, the change of the at least one period being performed in accordance with a speed at which the robot moves the welding torch.

19. The arc welding system according to claim 1, wherein the welding controller instructs the robot controller to decelerate movement of the welding torch relative to the to-be-welded object by decelerating a movement of the robot.

20. The arc welding system according to claim 1, wherein the welding controller is configured to instruct the robot controller to decelerate the movement of the welding torch relative to the to-be-welded object immediately following the determination by the welding controller that the first period has elapsed.

21. The method for performing arc welding according to claim 6, wherein the instructing step includes instructing the robot to decelerate movement of the welding torch relative to the to-be-welded object by decelerating a movement of the robot.

22. The method for performing arc welding according to claim 6, wherein the instructing step includes instructing the robot to decelerate the movement of the welding torch relative to the to-be-welded object immediately following the determination that the first period has elapsed.

23. The method for producing a welded product according to claim 7, wherein the instructing step includes instructing the robot to decelerate movement of the welding torch relative to the to-be-welded object by decelerating a movement of the robot.

24. The method for producing a welded product according to claim 7, wherein the instructing step includes instructing the robot to decelerate the movement of the welding torch relative to the to-be-welded object immediately following the determination that the first period has elapsed.

* * * * *